United States Patent Office 2,842,561
Patented July 8, 1958

2,842,561

NEW DYESTUFF INTERMEDIATES

David Alexander Whyte Fairweather and John Finnie McGechen, Manchester, England, assignors to Imperial Chemical Industries Limited, London, England, a corporation of Great Britain No Drawing. Application February 5, 1957
Serial No. 638,231

Claims priority, application Great Britain
February 6, 1956

8 Claims. (Cl. 260—351)

This invention relates to new dyestuff intermediates and more particularly it relates to new dyestuff intermediates useful for the manufacture of compounds of the acedianthrone series.

In United Kingdom specification No. 296,817 there is disclosed a process for the manufacture of condensation products of the anthraquinone series by condensing anthrone, a homologue or a halogen derivative thereof with glyoxal, its bisulphite compound, sulphuric ester or other compound giving rise to the formation of glyoxal. In the said specification it is disclosed that the reaction is preferably carried out in a solvent and if necessary in the presence of an acid or an acid reacting salt. The only solvent disclosed in the said specification is glacial acetic acid. It is stated in the said specification that the product produced from glyoxal and anthrone is probbaly 1:2-di(anthr-9-on-10-ylidene)-ethane.

This product is a valuable dyestuff intermediate which is readily converted to the vat dyestuff acedianthrone.

It is well known (see for example Berichte der deutschen chemischen Gesellschaft, 1939, page 2134) that the condensation of aldehydes and anthrone follows the rule that the two hydrogen atoms from the meso position of the anthrone and the carbonyl oxygen atom of the aldehyde are eliminated as water and there is obtained a product containing an unsaturated linkage in the meso position of the anthrone residue.

When anthrones are treated with glyoxal in many solvents there is either no reaction or there is formed the type of product disclosed in United Kingdom specification No. 296,817, but we have now found that when certain solvents are used under neutral conditions there are obtained new products wherein the meso positions of two anthrone residues are linked together by the grouping —CHOH—CHOH—.

Moreover it has been found that a new product so obtained may be readily converted to the corresponding 1:2-(anthr-9-on-10-ylidene)-ethane by a simple treatment with a dehydrating agent, and the overall yield and quality of the 1:2-(anthr-9-on-10-ylidene)-ethane so obtained is much higher than when the 1:2(anthr-9-on-10-ylidene)-ethane is made by the previously disclosed process.

According to the invention therefore there are provided new compounds of the formula:

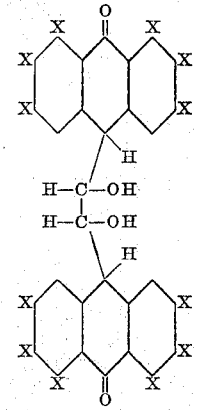

wherein X represents a hydrogen atom or a halogen atom.

As examples of halogen atoms represented by X there may be mentioned chlorine and bromine.

According to a further feature of the invention there is provided a process for the manufacture of the new compounds of the invention which comprises heating together, in a substantially neutral water-miscible organic solvent, glyoxal and an anthrone of the formula:

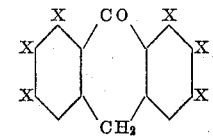

wherein X has the meaning stated above.

As examples of substantially neutral water-miscible organic solvents which may be used in the process of the invention there may be mentioned an alcohol for example ethanol or methanol, acetone and acetonitrile, and these are advantageously used in admixture with water.

As examples of anthrones which may be used in the process of the invention there may be mentioned anthrone, 1- and 2-chloro-9-anthrones 1- and 2-bromo-9-anthrones and 1:8- dichloro-9-anthrone.

In carrying out the process of the invention, the glyoxal may be added to the reaction medium as such or as an aqueous solution, but for convenience it is preferred to use the polymerised form known as glyoxal polymer or polyglyoxal. There may also be used glyoxal sulphate, or other relatively stable derivative of glyoxal which is known from the literature or which is used in practice as a source of glyoxal. When the derivative of glyoxal used in the process liberates one or more acidic products in addition to the glyoxal under the conditions used in the process, it is essential that there should also be present in the reaction mixture an acid-binding agent for example sodium acetate to absorb mineral acid.

The new compounds of the invention are insoluble in the reaction media. They may thus be conveniently isolated by filtration of the reaction mixture, if desired after cooling.

The products so obtained are stable substances when kept under substantially neutral conditions, but when treated with acidic reagents they decompose readily, with evolution of water, to give the compounds disclosed in United Kingdom specification No. 296,817.

According to a further feature of the invention therefore, there is provided a new process for the manufacture of 1:2-di-(anthr-9-on-10-ylidene)ethanes of the formula:

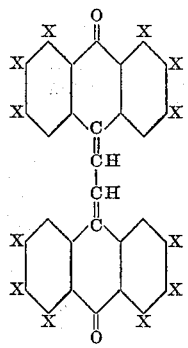

wherein X has the meaning stated above which comprises treating the new compounds of the invention as hereinbefore defined with a dehydrating agent.

As suitable dehydrating agents which may be used in the said new process there may be mentioned sulphuric acid, chlorosulphonic acid, anhydrides of organic acids, for example acetic anhydride, and acid chlorides, for example benzoyl chloride and if desired mixtures of more than one dehydrating agent may be used, for example there may be added a trace of sulphuric acid when dehydrating by acid anhydrides and acid chlorides, which addition is found to increase the rate of dehydration.

The new process for the manufacture of the 1:2-di-(anthr-9-on-10-ylidene)ethanes as hereinbefore defined is conveniently carried out by heating the reagents together preferably in an organic solvent for example nitrobenzene or acetic acid, and conveniently at a temperature between 25° C. and 100° C., although with a vigorous dehydrating agent, for example chlorosulphonic acid, the reaction may be carried out at a lower temperature for example at a temperature below 5° C.

The products so obtained are sparingly soluble in the common organic solvents and may be readily isolated from the reaction medium by filtration.

They may then be converted by known methods, for example by the methods described in United Kingdom specification No. 551,622, to the corresponding acedianthrones. When the new process is carried out in an organic solvent, the 1:2-(anthr-9-on-10-ylidene)ethanes as hereinbefore defined need not be isolated, but may be converted in situ to the corresponding acedianthrones.

The invention is illustrated, but not limited by the following examples in which the parts and percentages are by weight:

*Example 1*

A mixture of 19.4 parts of anthrone, 3.9 parts of glyoxal polymer (containing 78% of glyoxal) and 100 parts of 90.5% aqueous ethanol are stirred and boiled under a reflux condenser for five hours. The solution soon begins to deposit a micro-crystalline white powder, and when the reaction is finished the 1:2-di-(anthr-9-on-10-yl-)ethane-1:2-diol is filtered off and dried.

The product is almost insoluble in organic solvents, and has a melting point of 230° C. When subjected to analysis it is found to contain 80.8% of carbon and 4.8% of hydrogen ($C_{30}H_{22}O_4$ requires 80.7% of carbon and 4.9% of hydrogen).

In the above example, the ethanol can be replaced by an equal weight of methanol, or acetone. The proportion of water may be increased to 40–50% of the total weight of solvent.

*Example 2*

11.2 parts of 1:2-di-(anthr-9-on-10-yl-)ethane-1:2-diol are added to 120 parts of nitrobenzene and 32.5 parts of acetic anhydride. The mixture is stirred at 70° C. and 0.5 part of concentrated sulphuric acid is added over 15 minutes. The mixture is stirred for a further 15 minutes and the reaction mass is then cooled to 15° C. and the suspension of 1:2-di-(anthr-9-on-10-ylidene-)ethane in nitrobenzene so obtained is filtered. The residue is distilled in steam until it is free from nitrobenzene and it is then filtered off.

Instead of isolating the 1:2-di-(anthr-9-on-10-ylidene-)-ethane, it may be converted to acedianthrone as follows. The suspension of 1:2-di-(anthr-9-on-10-ylidene-)ethane in nitrobenzene obtained as described above is stirred between 15° C. and 20° C. and 16.2 parts of concentrated sulphuric acid are added. The mixture is then heated to 50° C. during 2 hours, stirred at 50° C. for 1 hour, then heated to 95° C. during 1 hour, stirred at 95° C. for 1 hour, cooled and filtered. The solid residue on the filter is washed with nitrobenzene and distilled in steam to remove the nitrobenzene. The acedianthrone is so obtained in good yield and purity.

*Example 3*

To a mixture of 300 parts of glacial acetic acid, 41 parts of acetic anhydride, and 7.5 parts of concentrated sulphuric acid there is added 44.6 parts of 1:2-di-(anthr-9-on-10-yl-)ethane-1:2-diol, and the mixture is stirred at 45–50° C. for 3 hours. 1:2-di-(anthr-9-on-10-ylidene)-ethane is thus obtained as a bright orange crystalline suspension, and is isolated by cooling and filtering the mixture and washing the residue with water, and drying.

*Example 4*

A suspension of 45 parts of 1:2-di-(anthr-9-on-10-yl-)-ethane-1:2-diol and 36 parts of finely divided sodium chloride is stirred in 250 parts of ethylene dichloride at a temperature between 0° C. and 5° C. and a solution of 36 parts of chlorosulphonic acid in 126 parts of ethylene dichloride is added. The mixture is stirred for 3 hours after the addition is complete and then heated to 20° C. Stirring is continued at 20° C. for 18 hours. The solvent is then removed by distillation in steam and the 1:2-di-(anthr-9-on-10-ylidene-)ethane is isolated by filtration. A nearly quantitative yield of a product of high purity is obtained.

*Example 5*

A mixture of 23 parts of 1-chloro-9-anthrone, 4 parts of glyoxal polymer (containing 78% of glyoxal), 80 parts of 90.5% aqueous ethanol and 20 parts of water are stirred and boiled under a reflux condenser for five hours. The mixture is cooled and the 1:2-di-(1-chloranthr-9-on-10-yl)ethane-1:2-diol which separates out is filtered off and dried.

*Example 6*

21.9 parts of 1:2-di-(1-chloranthr-9-on-10-yl)ethane-1:2-diol are added to 132 parts of nitrobenzene and 58 parts of acetic anhydride. The mixture is stirred at 70° C. and 0.75 part of sulphuric acid is added over 30 minutes. The mixture is stirred at 70° C. for a further 30 minutes, the reaction mixture is cooled to 15° C. and the yellow crystalline precipitate of 1:2-di-(1-chloranthr-9-on-10-ylidene-)ethane is filtered off and dried.

Instead of isolating the 1:2-di-(1-chloranthr-9-on-10-ylidene-)ethane it may be converted to 1:1′-dichloroacedianthrone as follows: The precipitate of 1:2-di-(1- chloranthr-9-on-10-ylidene-)ethane in nitrobenzene, obtained as described above, is stirred at 20° C. and 29 parts of concentrated sulphuric acid are added. The mixture is then heated to 95° C. during 1 hour and stirred at 95° C. for 1 hour. The mixture is cooled and the precipitate is filtered off and washed with nitrobenzene. The solid residue is distilled in steam to remove the nitrobenzene and dried. 1:1'-dichloroacedianthrone is so obtained in good yield and purity.

*Example 7*

In place of the 23 parts of 1-chloro-9-anthrone used in Example 5 there are used 23 parts of β-chloranthrone (which may be obtained by treating 2-chloranthraquinone with an aqueous solution of sodium hydrosulphite and sodium hydroxide), when 1:2-di(β-chloranthr-9-on-10-yl)ethane-1:2-diol is obtained in the form of a yellow crystalline powder.

*Example 8*

In place of the 21.9 parts of 1:2-di-(1-chloranthr-9-on-10-yl)ethane-1:2-diol used in Example 6 there are used 21.9 parts of 1:2-di-(β-chloranthr-9-on-10-yl)ethane-1:2-diol, when 1:2-di-(β-chloranthr-9-on-10-ylidene-)ethane is obtained which may be converted to β:β'-dichloracedianthrone by heating in nitrobenzene with sulphuric acid.

*Example 9*

A mixture of 26.3 parts of 1:8-dichloro-9-anthrone, 4 parts of glyoxal polymer (containing 78% of glyoxal), 0.1 part of piperidine and 120 parts of 90.5% aqueous ethanol are stirred and boiled under a reflux condenser for two hours. The 1:2-di-(1:8-dichloranthr-9-on-10-yl)ethane-1:2-diol separates out as a white crystalline powder which is filtered off and dried.

*Example 10*

A mixture of 19.4 parts of anthrone, 45 parts of sodium acetate crystals, 14.6 parts of glyoxal sulphate, 20 parts of water and 64 parts of 90.5% aqueous ethanol are stirred and boiled under a reflux condenser for 3 hours. The 1:2-di-(anthr-9-on-10-yl)ethane-1:2-diol which separates out, is filtered off, washed with water and dried.

What we claim is:
1. Compounds of the formula:

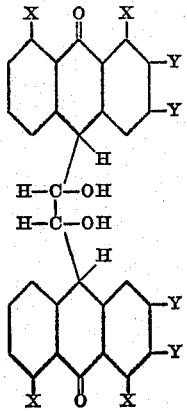

wherein X and Y are selected from the group consisting of hydrogen and chlorine atoms provided that X and Y are not both chlorine atoms.

2. Process for the manufacture of the compounds of claim 1 which comprises reacting together, in a substantially neutral water-soluble organic solvent, glyoxal and an anthrone of the formula:

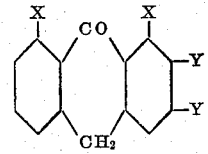

wherein X and Y are selected from the group consisting of hydrogen and chlorine atoms provided that X and Y are not both chlorine atoms.

3. Process as claimed in claim 2 wherein the substantially neutral water-soluble organic solvent is an aliphatic alcohol, the alkyl chain of which contains not more than 4 carbon atoms.

4. Process for the manufacture of 1:2-di-(anthr-9-on-10-ylidene-) ethanes of the formula:

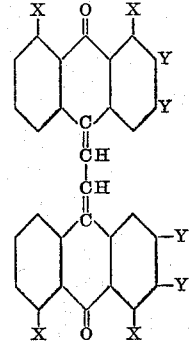

wherein X and Y are selected from the group consisting of hydrogen and chlorine atoms provided that X and Y are not both chlorine atoms, which comprises treating a compound, as claimed in claim 1, with a dehydrating agent.

5. The compound 1:2-di(anthr-9-on-10-yl-)ethane-1:2-diol.

6. The compound 1:2-di-(1-chloranthr-9-on-10-yl)-ethane-1:2-diol.

7. The compound 1:2-di(β-chloranthr-9-on-10-yl)-ethane-1:2-diol.

8. The compound 1:2-di-(1:8-dichloranthr-9-on-10-yl)ethane-1:2-diol.

References Cited in the file of this patent
UNITED STATES PATENTS 2,385,185    Batty et al. _____ Sept. 18, 1945